United States Patent
Senzaki

(10) Patent No.: US 11,146,725 B2
(45) Date of Patent: Oct. 12, 2021

(54) INFORMATION PROCESSING APPARATUS, CAMERA CONTROL METHOD, PROGRAM, CAMERA APPARATUS, AND IMAGE PROCESSING SYSTEM

(71) Applicant: NEC CORPORATION, Tokyo (JP)

(72) Inventor: Hiroshi Senzaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/828,523

(22) Filed: Mar. 24, 2020

(65) Prior Publication Data

US 2020/0314332 A1 Oct. 1, 2020

(30) Foreign Application Priority Data

Mar. 25, 2019 (JP) .............................. JP2019-056446

(51) Int. Cl.
*H04N 5/232* (2006.01)
*H04N 5/235* (2006.01)

(52) U.S. Cl.
CPC ....... *H04N 5/23222* (2013.01); *H04N 5/2353* (2013.01); *H04N 5/23206* (2013.01); *H04N 5/23225* (2013.01)

(58) Field of Classification Search
CPC ........... H04N 5/23222; H04N 5/23206; H04N 5/2353; H04N 5/23225
See application file for complete search history.

(56) References Cited

U.S. PATENT DOCUMENTS

2011/0249133 A1* 10/2011 Zhou .................... H04N 19/117
348/222.1
2016/0142680 A1* 5/2016 Tsunematsu ....... G06K 9/00342
348/159

FOREIGN PATENT DOCUMENTS

| JP | 2005-202731 A | 7/2005 |
| JP | 2007-274264 A | 10/2007 |
| JP | 2008-312036 A | 12/2008 |
| JP | 2009-055088 A | 3/2009 |
| JP | 2009-059185 A | 3/2009 |
| JP | 2009-260868 A | 11/2009 |
| JP | 2010-252374 A | 11/2010 |
| JP | 2014-036321 A | 2/2014 |
| JP | 2014-064083 A | 4/2014 |
| JP | 2014232971 A | 12/2014 |
| JP | 2016-072964 A | 5/2016 |
| JP | 2016-081249 A | 5/2016 |
| JP | 2016-092727 A | 5/2016 |
| WO | 2014/002398 A1 | 1/2014 |

OTHER PUBLICATIONS

Japanese Office Action of JP 2019-056446, dated Feb. 10, 2020.
Notice of Opposition for JP Patent No. 6721076 dated Feb. 12, 2021.

* cited by examiner

*Primary Examiner* — Ahmed A Berhan
(74) *Attorney, Agent, or Firm* — Sughrue Mion, PLLC

(57) ABSTRACT

A technique for reducing a work load during introduction of a system in the system processing an image generated by a camera. An information processing apparatus includes at least an accumulation unit, a recommended setting determination unit, and a camera control unit. The accumulation unit accumulates a score obtained through an authentication process using an image in which a person is captured and a camera setting at which a camera generates the image in a storage area. The recommended setting determination unit determines a recommended setting for the camera on the basis of a correspondence relationship between the score and the camera setting. The camera control unit controls the camera on the basis of the recommended setting.

16 Claims, 11 Drawing Sheets

FIG. 5

| ID | DATE-AND-TIME INFORMATION | CAMERA SETTING | AUTHENTI-CATION RESULT | AUTHENTI-CATION SCORE |
|---|---|---|---|---|
| 1 | 05/17/2018 15:31:25 | SETTING 1 | A | 60 |
| 2 | 05/17/2018 15:31:30 | SETTING 2 | A | 75 |
| 3 | 05/17/2018 15:31:35 | SETTING 3 | A | 80 |
| 4 | 05/17/2018 15:32:15 | SETTING 4 | A | 50 |
| 5 | 05/17/2018 15:32:45 | SETTING 5 | A | 80 |
| 6 | 05/17/2018 15:32:50 | SETTING 6 | A | 87 |
| 7 | 05/17/2018 15:32:55 | SETTING 7 | A | 92 |
| 8 | 05/17/2018 15:40:05 | SETTING 8 | A | 60 |

FIG. 6

| ID | DATE-AND-TIME INFORMATION | CAMERA SETTING | AUTHENTI-CATION RESULT | AUTHENTI-CATION SCORE |
|---|---|---|---|---|
| 1 | 05/17/2018 15:31:25 | SETTING 1 | A | 80 |
| 2 | 05/17/2018 15:31:30 | SETTING 2 | A | 90 |
| 3 | 05/17/2018 15:42:40 | SETTING 1 | B | 70 |
| 4 | 05/17/2018 15:42:45 | SETTING 2 | B | 85 |
| 5 | 05/17/2018 15:52:55 | SETTING 1 | C | 75 |
| 6 | 05/17/2018 15:53:00 | SETTING 2 | C | 60 |

FIG. 7

| ID | DATE-AND-TIME INFORMATION | CAMERA SETTING | AUTHENTI-CATION RESULT | AUTHENTI-CATION SCORE |
|---|---|---|---|---|
| 1 | 05/17/2018 15:31:25 | SETTING 1 | A | 80 |
| 2 | 05/17/2018 15:31:30 | SETTING 2 | A | 90 |
| 3 | 05/17/2018 15:31:35 | SETTING 3 | A | 85 |
| 4 | 05/17/2018 15:42:40 | SETTING 1 | B | 70 |
| 5 | 05/17/2018 15:42:45 | SETTING 2 | B | 85 |
| 6 | 05/17/2018 15:42:50 | SETTING 3 | B | 90 |
| 7 | 05/17/2018 15:52:55 | SETTING 1 | C | 75 |
| 8 | 05/17/2018 15:53:00 | SETTING 2 | C | 60 |
| 9 | 05/17/2018 15:53:05 | SETTING 3 | C | 95 |

FIG. 10

| PERSONAL IDENTIFICATION INFORMATION | RECOMMENDED SETTING |
|---|---|
| A | SETTING 1 |
| B | SETTING 2 |
| C | SETTING 3 |

INFORMATION PROCESSING APPARATUS, CAMERA CONTROL METHOD, PROGRAM, CAMERA APPARATUS, AND IMAGE PROCESSING SYSTEM

This application is based on Japanese patent application NO. 2019-056446, the content of which is incorporated hereinto by reference.

BACKGROUND

Technical Field

The present invention relates to an information processing apparatus, a camera control method, a program, a camera apparatus, and an image processing system.

Related Art

Re-publication of PCT International Publication No. WO2014/002398 discloses a technique of calculating a value indicating evaluation of a state (a position, a posture, or the like) of a camera generating an image from the viewpoint of how well an object (a person or the like) appears in the image in a state suitable for image processing. Specifically, Re-publication of PCT International Publication No. WO2014/002398 discloses a technique of calculating an evaluation value indicating whether or not a state (camera parameter) of the current camera is suitable for image processing on the basis of (1) a resolution of a target object in an image, (2) a gazing point angle to the target object (an angle formed between a straight line connecting a camera position to a gazing point position in the target object and a ground surface), and (3) the degree to which a target region (a region in a real space imaged by the camera) overlaps a target object view region (a region in a real space in which a target object model is included in an image).

SUMMARY

In a system performing an authentication process or the like for authenticating a person by using an image of the person, a setting of a camera is one of principal factors for determining the accuracy of a personal authentication process. In a case where the setting of the camera is not suitable, the accuracy of an authentication process using an image generated by the camera is reduced. Thus, it is necessary to adjust a setting of a camera to be optimized at the time of introducing the system, but the adjustment work requires considerable time and effort.

The present invention has been made in light of the problem. One of the objects of the present invention is to provide a technique of reducing a work load during introduction of a system in the system processing an image generated by a camera.

In one embodiment, there is provided an information processing apparatus including an accumulation unit that accumulates a score obtained through an authentication process using an image in which a person is captured and a camera setting at which a camera generates the image in a storage area; a recommended setting determination unit that determines a recommended setting for the camera on the basis of a correspondence relationship between the score and the camera setting; and a camera control unit that controls the camera on the basis of the recommended setting.

In another embodiment, there is provided a camera control method including causing a computer to accumulate a score obtained through an authentication process on a person captured in an image and a camera setting at which a camera generates the image in a storage area, determine a recommended setting for the camera on the basis of a correspondence relationship between the score and the camera setting accumulated in the storage area, and control the camera on the basis of the recommended setting.

In still another embodiment, there is provided a program causing a computer to execute the camera control method.

In still another embodiment, there is provided a camera including a transmission unit that transmits an image in which a person is captured and a camera setting at which the camera generates the image to an external apparatus; and a setting changing unit that acquires recommended setting information indicating a camera setting recommended in a case where the camera generates an image from the external apparatus, and changes the camera setting for the camera on the basis of the recommended setting information.

In still another embodiment, there is provided an image processing system including a camera that generates an image in which a person is captured while changing a camera setting; an authentication unit that executes an authentication process by using the image; an accumulation unit that accumulates a score obtained through the authentication process and a camera setting at which the camera generates the image in a storage area; a recommended setting determination unit that determines a recommended setting for the camera on the basis of a correspondence relationship between the score and the camera setting accumulated in the storage area; and a camera control unit that controls the camera on the basis of the recommended setting.

According to the present invention, it is possible to reduce a work load during introduction of a system in the system processing an image generated by a camera.

BRIEF DESCRIPTION OF THE DRAWINGS

The above and other objects, advantages and features of the present invention will be more apparent from the following description of certain preferred example embodiments taken in conjunction with the accompanying drawings, in which:

FIG. 5 is a diagram illustrating an example of a database that stores a result of an authentication process in correlation with a camera setting;

FIG. 6 is a diagram illustrating another example of a database that stores a result of an authentication process in correlation with a camera setting;

FIG. 7 is a diagram illustrating still another example of a database that stores a result of an authentication process in correlation with a camera setting;

FIG. 10 is a diagram illustrating an example of information stored in the recommended setting storage unit.

DETAILED DESCRIPTION

Figure 1:
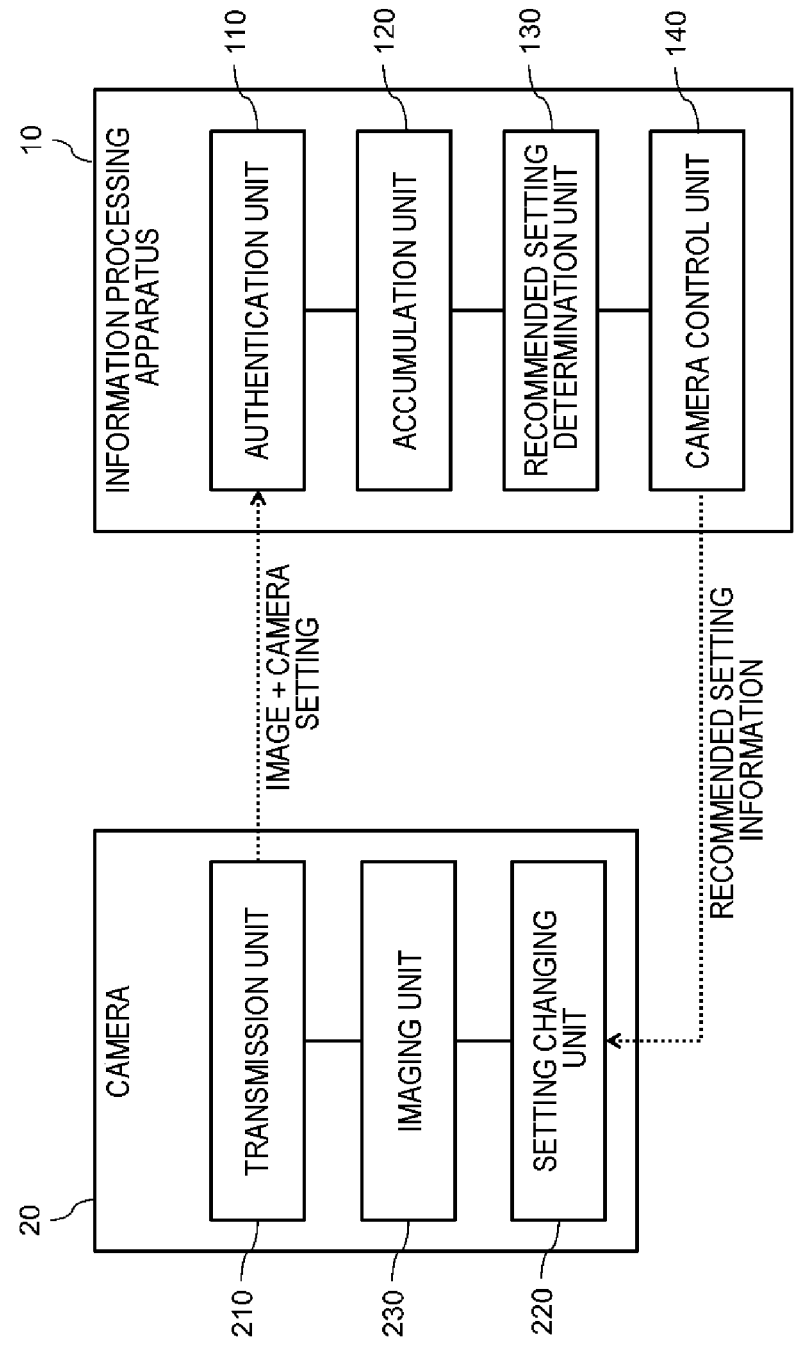
FIG. 1 is a diagram exemplifying a configuration of an image processing system of a first example embodiment.

The invention will be now described herein with reference to illustrative embodiments. Those skilled in the art will recognize that many alternative embodiments can be accomplished using the teachings of the present invention and that the invention is not limited to the example embodiments illustrated for explanatory purposes.

An image processing system according to the present invention has a function of automatically determining a camera setting (hereinafter, also referred to as a "recommended setting") that is recommended for a camera generating an image (an image in which a person is captured) used as an input of an authentication process for the person, and controlling the camera on the basis of the determined recommended setting. It should be noted that, in the present specification, the "camera setting" indicates a setting that influences at least one of an imaging range of the camera, the manner in which a subject (person) appears, and image quality. Specifically, the camera setting includes at least one of a posture (a pan angle or a tilt angle), an imaging magnification, a length of an exposure time (shutter speed), luminance, saturation, an imaging resolution, and compression quality.

Hereinafter, example embodiments of the present invention will be described with reference to the drawings. It should be noted that the same constituent element will be given the same reference numeral throughout all the drawings, and a description thereof will not be repeated as appropriate. In each block diagram, each block represents a configuration in the functional unit instead of a configuration in the hardware unit unless particularly mentioned. A direction of an arrow in the drawing is used to facilitate the understanding of a flow of information, and does not limit a communication direction (unidirectional communication/bi-directional communication) unless particularly mentioned.

First Example Embodiment

<Functional Configuration of Information Processing Apparatus 10>

FIG. 1 is a diagram exemplifying a configuration of an image processing system 1 of a first example embodiment. The image processing system 1 exemplified in FIG. 1 is configured to include an information processing apparatus 10 and a camera 20.

As illustrated in FIG. 1, the information processing apparatus 10 includes an authentication unit 110, an accumulation unit 120, a recommended setting determination unit 130, and a camera control unit 140. The authentication unit 110 acquires an image generated by the camera 20, and executes an authentication process for a person captured in the image. The accumulation unit 120 correlates a score (authentication score) obtained in an authentication process using the image in which the person is captured with a camera setting at which the camera 20 generates the image, and accumulates the correlated result in a predetermined storage area. The recommended setting determination unit 130 determines a recommended setting for the camera 20 on the basis of the information (a correspondence relationship between the authentication score and the camera setting) accumulated in the predetermined storage area. The camera control unit 140 controls the camera 20 on the basis of the recommended setting determined by the recommended setting determination unit 130.

<Hardware Configuration Example of Information Processing Apparatus 10>

Figure 2:
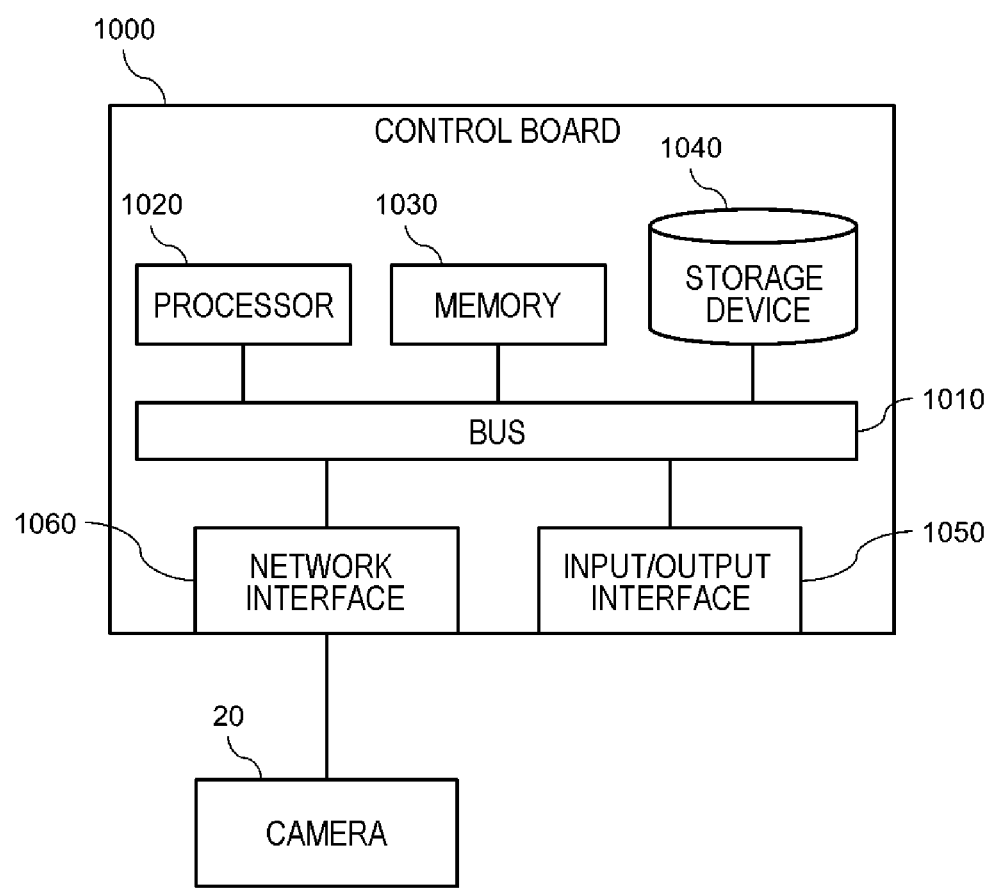
FIG. 2 is a block diagram exemplifying a hardware configuration of an information processing apparatus.

Each functional configuration unit of the information processing apparatus 10 may be realized by hardware (a hard-wired electronic circuit or the like) realizing each functional configuration unit, and may be realized by a combination of hardware and software (for example, a combination of an electronic circuit and a program controlling the electronic circuit). Hereinafter, with reference to FIG. 2, a description will be further made of a case where the information processing apparatus 10 realizes each functional configuration unit through a combination of hardware and software. FIG. 2 is a block diagram exemplifying a hardware configuration of the information processing apparatus 10.

The information processing apparatus 10 is configured to include a control board 1000. The control board 1000 includes a bus 1010, a processor 1020, a memory 1030, a storage device 1040, an input/output interface 1050, and a network interface 1060.

The bus 1010 is a data communication path through which the processor 1020, the memory 1030, the storage device 1040, the input/output interface 1050, and the network interface 1060 transmit and receive data to and from each other. However, a method of coupling the processor 1020 and the like to each other is not limited to bus coupling.

The processor 1020 is a processor configured with a central processing unit (CPU), a graphics processing unit (GPU), or the like.

The memory 1030 is a main storage device realized by a random access memory (RAM) or the like.

The storage device 1040 is an auxiliary storage device realized by a hard disk drive (HDD), a solid state drive (SSD), a memory card, a read only memory (ROM), or the like. The storage device 1040 stores a program module realizing each function (the authentication unit 110, the accumulation unit 120, the recommended setting determination unit 130, the camera control unit 140, or the like) of the information processing apparatus 10. The processor 1020 reads each program module onto the memory 1030, and executes the program module, and thus the function corresponding to each program module is realized.

The input/output interface 1050 is an interface coupling the information processing apparatus 10 to various input and output devices. The input/output interface 1050 may be coupled to an input device (not illustrated) such as a keyboard or a mouse, and an output device (not illustrated) such as a display or a speaker.

The network interface 1060 is an interface coupling the information processing apparatus 10 to a network. The network is, for example, a local area network (LAN) or a wide area network (WAN). A method in which the network interface 1060 is coupled to the network may be wireless coupling and may be wired coupling. In the example illustrated in FIG. 2, the information processing apparatus 10 is coupled to the camera 20 through the network interface 1060. The information processing apparatus 10 may communicate with the camera 20 through the network interface 1060, so as to acquire an image in which a person is captured and a camera setting related to the image. The information processing apparatus 10 may communicate with the camera 20 through the network interface 1060, so as to transmit information indicating a recommended setting for the camera 20 determined by the recommended setting determination unit 130 to the camera 20.

<Functional Configuration of Camera 20>

The camera 20 is provided to include a predetermined area in an imaging range. The predetermined area includes, for example, a region in which a gate for managing entrance and exit of a person is provided or a region that is set as a surveillance target area. The camera 20 images a person present in the predetermined area while changing a camera setting. As exemplified in FIG. 1, the camera 20 includes a transmission unit 210, a setting changing unit 220, and an imaging unit 230. The imaging unit 230 is a camera module including an imaging element and an optical system such as a lens. The transmission unit 210 transmits an image in which a person is captured, generated by using the imaging unit 230, and a camera setting at which the camera 20 (imaging unit 230) generates the image, to the information processing apparatus 10 (external apparatus). The setting changing unit 220 acquires information (hereinafter, referred to as "recommended setting information") indicating a camera setting recommended in a case where the camera 20 (imaging unit 230) generates an image in which a person is captured, from the information processing apparatus 10 (external apparatus). The setting changing unit 220 changes a camera setting for the camera 20 (imaging unit 230) on the basis of the recommended setting information acquired from the information processing apparatus 10.

<Hardware Configuration Example of Camera 20>

Figure 3:
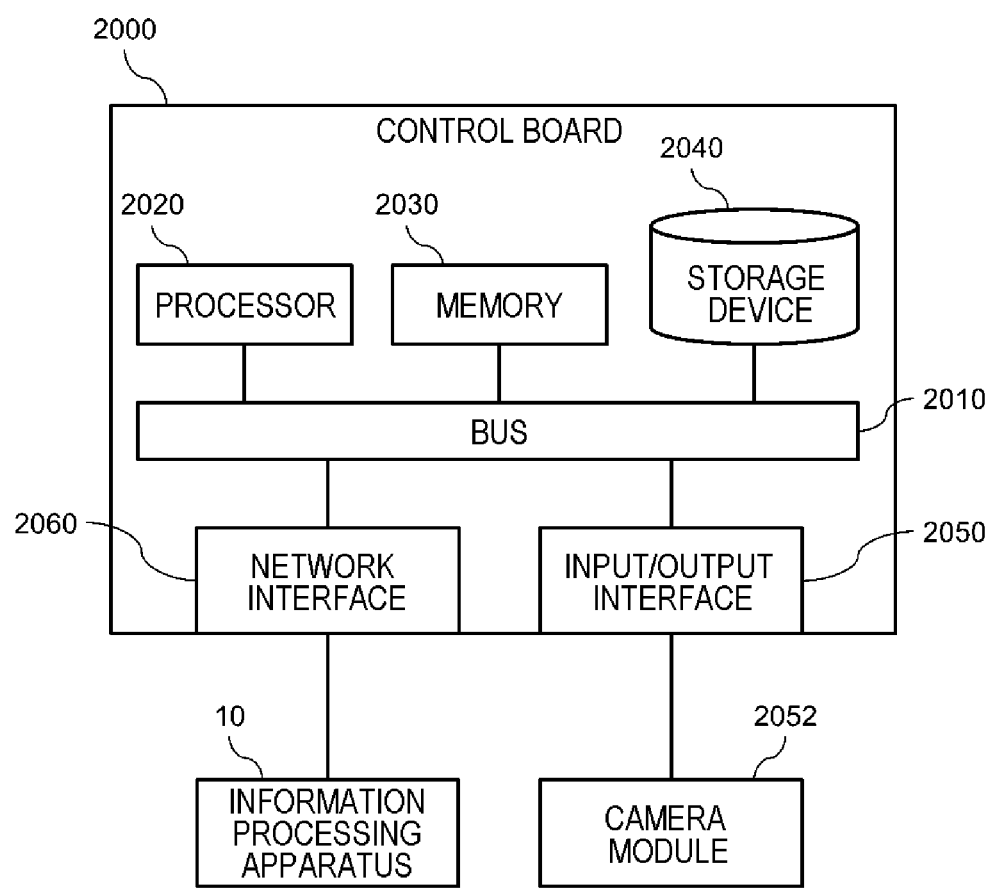
FIG. 3 is a block diagram exemplifying a hardware configuration of a camera.

FIG. 3 is a block diagram exemplifying a hardware configuration of the camera 20.

The camera 20 is configured to include a control board 2000. The control board 2000 includes a bus 2010, a processor 2020, a memory 2030, a storage device 2040, an input/output interface 2050, and a network interface 2060.

The bus 2010 is a data communication path through which the processor 2020, the memory 2030, the storage device 2040, the input/output interface 2050, and the network interface 2060 transmit and receive data to and from each other. However, a method of coupling the processor 2020 and the like to each other is not limited to bus coupling.

The processor 2020 is a processor realized by a central processing unit (CPU), a digital signal processor (DSP), or the like.

The memory 2030 is a main storage device realized by a random access memory (RAM) or the like.

The storage device 2040 is an auxiliary storage device realized by a hard disk drive (HDD), a solid state drive (SSD), a memory card, a read only memory (ROM), or the like. The storage device 2040 stores a program module realizing each function (the transmission unit 210, the setting changing unit 220, and the imaging unit 230, or the like) of the camera 20. The processor 2020 reads each program module onto the memory 2030, and executes the program module, and thus the function corresponding to each program module is realized.

The input/output interface 2050 is an interface coupling the control board 2000 to various modules. As illustrated in FIG. 3, the input/output interface 2050 is coupled to a camera module 2052 or the like. The camera module 2052 is configured to include an imaging element such as a charge coupled device (CCD) or a complementary metal-oxide-semiconductor (CMOS), an image processing engine generating image data on the basis of an output signal from the imaging element, and mechanisms controlling a posture (a pan angle or a tilt angle) of the camera 20, an imaging magnification of the camera 20, and a shutter speed of the camera 20.

The network interface 2060 is an interface coupling the camera 20 to a network. The network is, for example, a local area network (LAN) or a wide area network (WAN). A method in which the network interface 2060 is coupled to the network may be wireless coupling and may be wired coupling. In the example illustrated in FIG. 3, the camera 20 is coupled to the information processing apparatus 10 through the network interface 2060. The camera 20 may communicate with the information processing apparatus 10 through the network interface 2060, so as to transmit an image in which a person is captured and a camera setting at which the image is generated to the information processing apparatus 10. The camera 20 may communicate with the information processing apparatus 10 through the network interface 2060, so as to acquire information indicating a recommended setting for the camera 20 determined by the recommended setting determination unit 130.

<Flow of Process>

Figure 4:
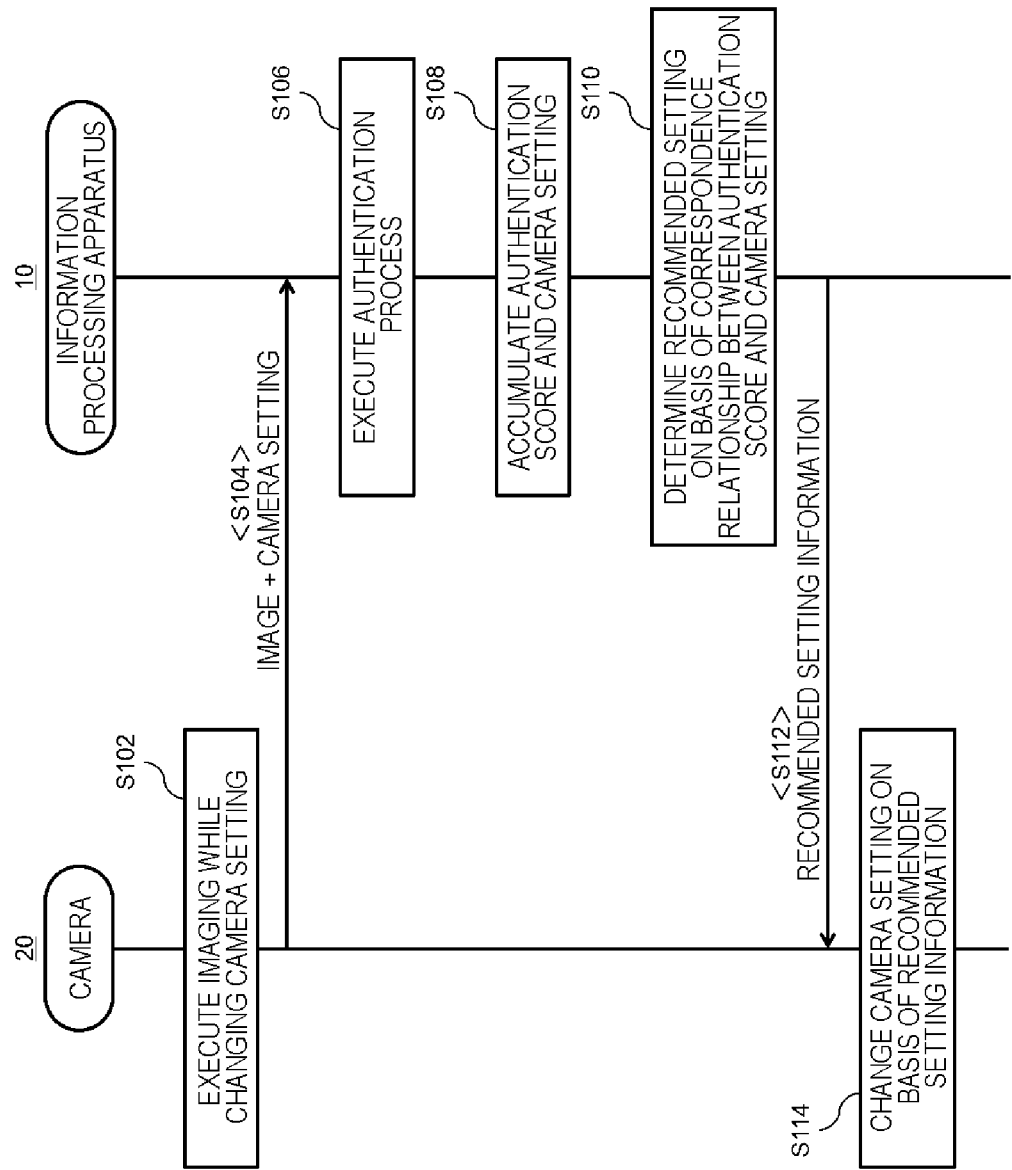
FIG. 4 is a sequence diagram exemplifying a flow of a process executed by the image processing system of the first example embodiment.

FIG. 4 is a sequence diagram exemplifying a flow of a process executed by the image processing system 1 of the first example embodiment.

First, the camera 20 performs imaging while changing a camera setting (S102). The transmission unit 210 transmits an image generated through the process in S102 and information indicating a camera setting at which the image is generated, to the information processing apparatus 10 (S104).

The authentication unit 110 executes an authentication process on a person captured in the image by using the image acquired from the camera 20 (S106). For example, the authentication unit 110 acquires an image in which a person passing through a gate for managing entrance to and exit from a specific region is captured, from the camera 20, and executes an authentication process on the person captured in the image. For example, the authentication unit 110 acquires an image in which a person present in a specific surveillance region (for example, a large-scale commercial facility or an event hall) is captured from the camera 20, and executes an authentication process on the person captured in the image.

In the authentication process in S106, the authentication unit 110 acquires information indicating an authenticated person and a certainty factor (authentication score) that the person captured in the image is the authenticated person. Specifically, first, the authentication unit 110 processes the image acquired from the camera 20 so as to extract plural keypoints (points indicating the eyes, the nose, and the mouse of the person), and obtains data indicating disposition of the keypoints. The authentication unit 110 compares the data indicating the disposition of the keypoints with registered data that is registered in advance for personal authentication, and calculates a similarity between the pieces of data. The authentication unit 110 determines a person corresponding to registered data (in a case where there are plural pieces of data, registered data causing the highest similarity to be obtained) causing a similarity of a predetermined reference value or greater to be obtained as an "authenticated person", and acquires the similarity as an authentication score.

The accumulation unit 120 correlates results (the authenticated person and the authentication score) of the authentication process obtained through the process in S106 with the camera setting, and accumulates a correlated result in a predetermined storage area (S108). The accumulation unit 120 accumulates results (an authenticated person and an authentication score) of an authentication process using each image and a camera setting, for example, in a database or the like built in the storage device 1040.

The recommended setting determination unit 130 determines a recommended setting that is recommended in a case where the camera 20 generates an image on the basis of a correspondence relationship between the authentication score and the camera setting accumulated in the storage area (S110). Here, the recommended setting determination unit 130 may execute a process of determining a recommended setting at any timing. For example, the recommended setting determination unit 130 may be configured to determine a recommended setting by using the information accumulated in the database when a predetermined period elapses. The recommended setting determination unit 130 may be configured to determine a recommended setting by using the information accumulated in the database in a case where a statistical value (for example, an average value) of an authentication score obtained through the previous authentication process is smaller than a reference value for determining whether or not a camera setting is required to be updated. A recommended setting for the camera 20 is reconsidered periodically or in a stage in which a predetermined condition regarding an authentication score is satisfied, and thus the accuracy of generating an image causing a favorable authentication score to be obtained can be maintained.

Here, a description will be made of a flow in which the recommended setting determination unit 130 determines a recommended setting on the basis of a correspondence relationship between an authentication score and a camera setting accumulated in the storage area. As an example, in a case where there is a single person as an authentication process target, or a person having an average physical feature is determined in advance among authentication target persons, the recommended setting determination unit 130 may determine a camera setting causing the highest authentication score with respect to the determined person, and may determine the camera setting as a recommended setting for the camera 20. As a specific example, a case is supposed in which information as exemplified in FIG. 5 is stored in the database. FIG. 5 is a diagram illustrating an example of a database storing a result of an authentication process and a camera setting in correlation with each other. The database exemplified in FIG. 5 stores a result of an authentication process on a specific person (person A) in correlation with an authentication score. In the example illustrated in FIG. 5, an authentication score at a camera setting corresponding to "setting 7" is the maximum value of "92". In this case, the recommended setting determination unit 130 determines the camera setting corresponding to "setting 7" at which the authentication score is the maximum as a recommended setting for the camera 20.

As another example, in a case where plural persons are authentication process targets, the recommended setting determination unit 130 may determine a camera setting at which authentication scores for the plural persons are equal to or more than a predetermined reference value by referring to information accumulated in the database, and may determine the camera setting as a recommended setting for the camera 20. As a specific example, a case is supposed in which information as illustrated in FIG. 6 is stored in the database, and a predetermined reference value regarding an authentication score is "70". FIG. 6 is a diagram illustrating another example of a database storing a result of an authentication process in correlation with a camera setting. In a case of the example illustrated in FIG. 6, at a camera setting corresponding to "setting 1", authentication scores for plural persons A to C are equal to or more than the predetermined reference value. On the other hand, at a camera setting corresponding to "setting 2", authentication scores for the persons A and B are equal to or more than the predetermined reference value, but an authentication score for the person C is less than the predetermined reference value. In this case, the recommended setting determination unit 130 determines the camera setting corresponding to "setting 1" as a recommended setting for the camera 20.

It is assumed that information as illustrated in FIG. 7 is stored in the database, and a predetermined reference value regarding an authentication score is "70". FIG. 7 is a diagram illustrating still another example of a database storing a result of an authentication process in correlation with a camera setting. In the example illustrated in FIG. 7, at a camera setting corresponding to "setting 1" and a camera setting corresponding to "setting 3", authentication scores for the persons A to C are a predetermined reference value. As mentioned above, in a case where there are plural camera setting candidates, the recommended setting determination unit 130 may be configured to determine a recommended setting on the basis of a statistically processed value of authentication scores for plural persons. For example, in a case of the example illustrated in FIG. 7, at the camera setting corresponding to "setting 1", a total value of the authentication scores for the persons A to C is "225", and an average value thereof is "75". On the other hand, at the camera setting corresponding to "setting 3", a total value of the authentication scores for the persons A to C is "270", and an average value thereof is "90". In this case, the recommended setting determination unit 130 determines, as a recommended setting for the camera 20, the camera setting corresponding to "setting 3" at which a statistically processed value such as a total value or an average value is great.

Referring to FIG. 4 again, the camera control unit 140 generates recommended setting information indicating the recommended setting to the camera 20 and transmits the recommended setting information to the camera 20 such that a camera setting for the camera 20 is changed to the recommended setting determined through the process in S110 (S112). The recommended setting information is information indicating a setting value recommended for at least one of a posture (a pan angle or a tilt angle) of the camera 20, an imaging magnification, a length of an exposure time (shutter speed), luminance, saturation, an imaging resolution, and compression quality. The camera control unit 140 may transmit the recommended setting information to the camera 20 so as to control at least one of a posture (a pan angle or a tilt angle) of the camera 20, an imaging magnification of the camera 20, a length of an exposure time (shutter speed) of the camera 20, luminance, saturation, an imaging resolution, and compression quality.

In a case where the recommended setting information is acquired from the information processing apparatus 10, the setting changing unit 220 changes the camera setting for the camera 20 to the recommended setting indicated by the recommended setting information (S114). Specifically, the setting changing unit 220 controls a mechanism controlling a posture (a pan angle or a tilt angle) of the camera 20, a mechanism controlling an imaging magnification of the camera 20, a mechanism controlling a shutter speed of the camera 20, or an image processing engine (a portion controlling luminance, saturation, an imaging resolution, compression quality, and the like) generating an image on the basis of an output signal from the imaging element, according to the camera setting indicated by the recommended setting information acquired from the information processing apparatus 10. Consequently, at least one of the posture of the camera 20, the imaging magnification, the length of an exposure time (shutter speed), the luminance, the saturation, the imaging resolution, and the compression quality is changed in accordance with the recommended setting.

<Advantageous Effects>

In the present example embodiment, first, a score (authentication score) obtained through an authentication process using an image and a camera setting for the camera 20 at which the image is generated are accumulated in a storage area in correlation with each other. A camera setting (recommended setting) for the camera 20 recommended to generate an image causing an authentication result with a high certainty factor to be obtained is determined on the basis of the information accumulated in the storage area as mentioned above, and a notification thereof is sent to the camera 20. A camera setting for the camera 20 is automatically changed to the recommended setting. In other words, adjustment work for the camera 20 for obtaining an image suitable for an authentication process is automated. According to the configuration of the present example embodiment, an effect of reducing a work load during introduction of a system can be expected for a manager of the image processing system 1. Since human cost is reduced by reducing a work load during introduction of a system, and thus the image processing system 1 can be provided at low cost, an effect of promoting the use of the image processing system 1 can also be expected.

Modification Examples

In a case where the camera 20 is a so-called intelligent camera mounted with a processor for image processing, at least some of processing units of the information processing apparatus 10 may be provided in the camera 20. For example, the camera 20 (intelligent camera) includes a processing unit (a processing unit corresponding to the authentication unit 110) executing an authentication process using a face image, and the information processing apparatus 10 may include the accumulation unit 120, the recommended setting determination unit 130, and the camera control unit 140. In this case, the processing unit corresponding to the authentication unit 110 provided in the camera 20 executes an authentication process by using an image, and the information processing apparatus 10 acquires an authentication score obtained through the authentication process and a camera setting from the camera 20, and accumulates the authentication score and the camera setting in the storage device 1040 or the like. The information processing apparatus 10 determines a recommended setting on the basis of the accumulated information (a combination of the authentication score and the camera setting), and notifies the camera 20 of the recommended setting. With this configuration, the effects can also be achieved.

The recommended setting determination unit 130 may be configured to determine a recommended setting for each temporal condition based on an operation timing (a timing at which an image is generated by the camera 20) of the camera 20. For example, the recommended setting determination unit 130 may be configured to determine a recommended setting for each season, a recommended setting for each time period, a recommended setting for each month or each day of the week, or the like, on the basis of an operation timing (a timing at which an image is generated by the camera 20) of the camera 20. In the above-described way, it is possible to absorb a difference between recommended settings due to a difference in environmental light (light received by the imaging element of the camera 20) according to a time period or a season, and thus to stably achieve the effects.

Second Example Embodiment

So-called multi-factor authentication may be employed in which biometric authentication using a physical feature of a person such as a face image is combined with knowledge authentication using knowledge such as a password that only the person himself/herself knows or possession authentication using only the person's possession such as an IC card. In the present example embodiment, a description will be made of an example of a configuration of an image processing system 1 in a case where the multi-factor authentication is employed. The present example embodiment is the same as the first example embodiment except for the following description.

<Functional Configuration Example>

Figure 8:
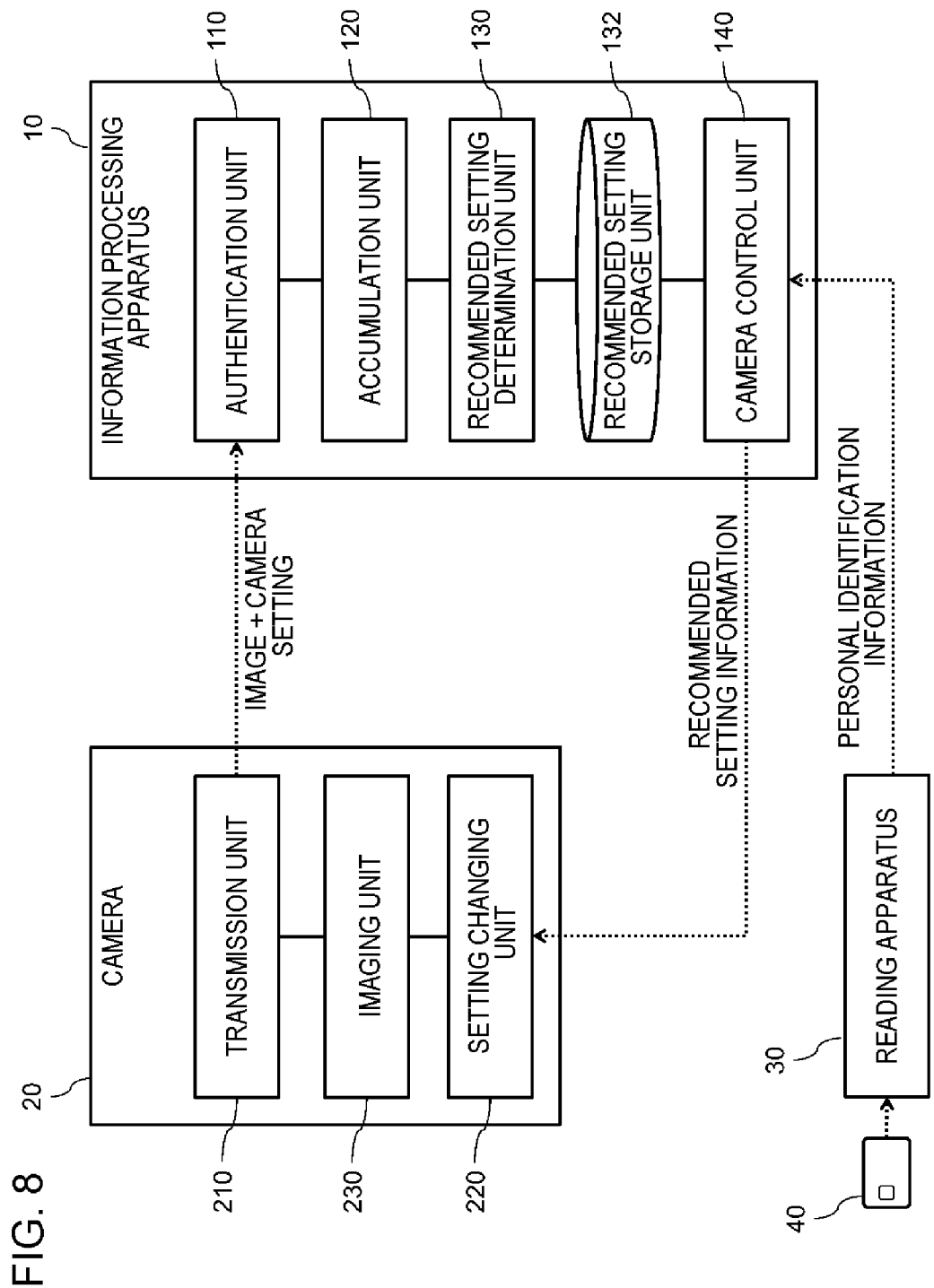
FIG. 8 is a diagram exemplifying a configuration of an image processing system in a second example embodiment.

FIG. 8 is a diagram exemplifying a configuration of the image processing system 1 of a second example embodiment. As illustrated in FIG. 8, the image processing system 1 of the present example embodiment is configured to include an information processing apparatus 10, a camera 20, and a reading apparatus 30. The reading apparatus 30 is an apparatus reading an IC card 40 storing information for identifying each person (personal identification information).

The recommended setting determination unit 130 of the present example embodiment determines a recommended setting for the camera 20 for each person on the basis of a correspondence relationship between an authentication score and a camera setting, and stores the recommended setting for each person in a recommended setting storage unit 132. The camera control unit 140 of the present example embodiment is operated as follows. First, the camera control unit 140 acquires personal identification information that is read from the IC card 40 by the reading apparatus 30. The camera control unit 140 determines a recommended setting corresponding to the acquired personal identification information among recommended settings for each person stored in the recommended setting storage unit 132. The camera control unit 140 controls the camera 20 on the basis of the determined recommended setting.

<Flow of Process>

Figure 9:
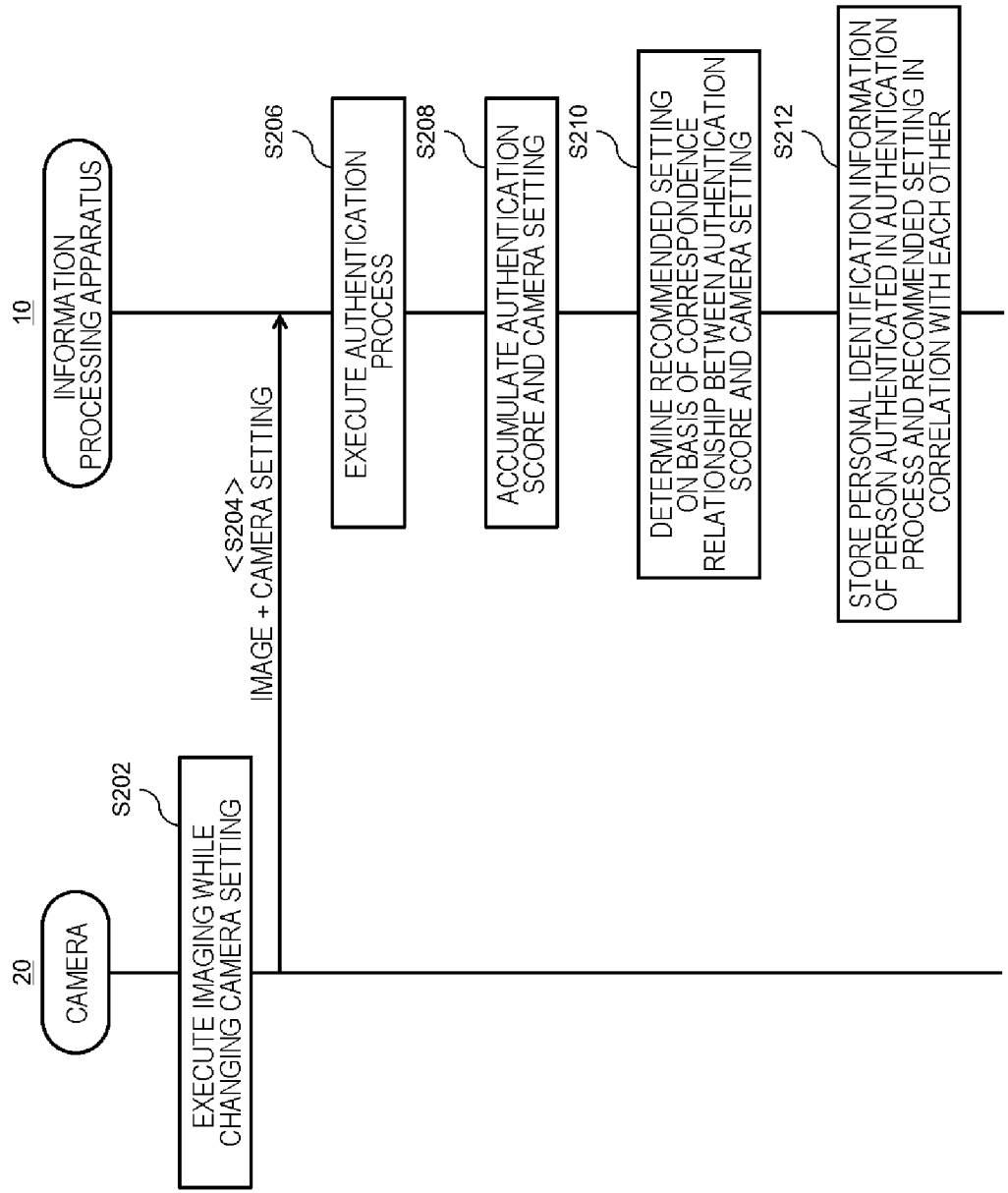
FIG. 9 is a sequence diagram illustrating a flow of a process until a recommended setting for each individual is accumulated in a recommended setting storage unit.

FIG. 9 is a sequence diagram illustrating a flow of a process until a recommended setting for each person is accumulated in the recommended setting storage unit 132.

First, the camera 20 performs imaging while changing a camera setting (S202). The transmission unit 210 transmits an image generated through the process in S202 and information indicating a camera setting at which the image is generated, to the information processing apparatus 10 (S204). The authentication unit 110 executes an authentication process on a person captured in the image by using the image acquired from the camera 20 (S206). The accumulation unit 120 correlates results (the authenticated person and the authentication score) of the authentication process obtained through the process in S206 with the camera setting, and accumulates a correlated result in a predetermined storage area (S208). The recommended setting determination unit 130 determines a recommended setting that is recommended in a case where the camera 20 generates an image on the basis of a correspondence relationship between the authentication score and the camera setting accumulated in the storage area (S210). The processes in S202 to S210 are the same as the processes in S102 to S110 in FIG. 4.

The recommended setting determination unit 130 correlates personal identification information allocated to the person authenticated through the authentication process in S206 with information indicating the recommended setting determined in S210, and stores the correlated result in a storage area such as the storage device 1040 (S212). Consequently, information indicating a recommended setting for each person is stored in a storage area such as the storage device 1040 (for example, FIG. 10). FIG. 10 is a diagram illustrating an example of information stored in the recommended setting storage unit 132. Information exemplified in FIG. 10 indicates that a camera setting for the camera 20 recommended in a case where a person A is imaged is "setting 1", a camera setting for the camera 20 recommended in a case where a person B is imaged is "setting 2", and a camera setting for the camera 20 recommended in a case where a person C is imaged is "setting 3".

Figure 11:
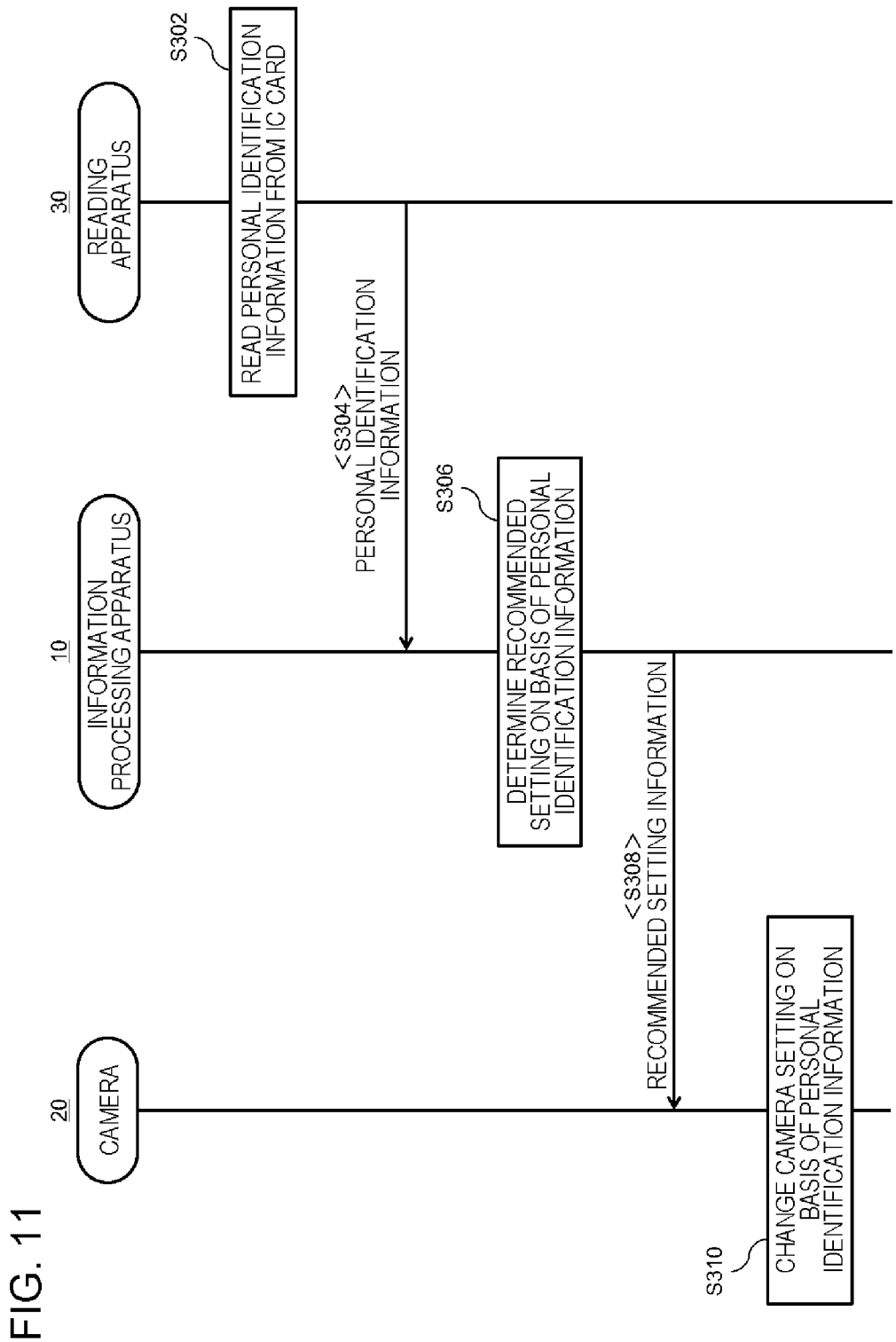
FIG. 11 is a sequence diagram illustrating a flow of a process of controlling the camera by using a recommended setting for each individual.

FIG. 11 is a sequence diagram illustrating a flow of a process of controlling the camera 20 by using a recommended setting for each person.

First, the reading apparatus 30 performs short-range radio communication with the IC card 40, reads personal identification information stored in the IC card 40, and transmits the personal identification information to the information processing apparatus 10 (S302 and S304).

The camera control unit 140 determines a recommended setting on the basis of the personal identification information acquired from the reading apparatus 30 (S306). For example, a case is supposed in which information as illustrated in FIG. 10 is stored in the recommended setting storage unit 132. In this case, when the personal identification information acquired through the process in S304 is information indicating the person A, the camera control unit 140 may determine the camera setting corresponding to "setting 1" as a recommended setting for the person on the basis of the information exemplified in FIG. 10. The camera control unit 140 transmits recommended setting information indicating the recommended setting for each person determined through the process in S306 to the camera 20 (S308).

When the recommended setting information is acquired from the information processing apparatus 10, the setting changing unit 220 changes a camera setting for the camera 20 to the recommended setting indicated by the recommended setting information (S310). For example, in a case where the recommended setting information acquired through the process in S308 indicates the recommended setting (the camera setting corresponding to "setting 1") for the person A, the setting changing unit 220 changes a camera setting for the camera 20 to the recommended setting (the camera setting corresponding to "setting 1") for the person A.

<Advantageous Effects>

As mentioned above, in the present example embodiment, in a case where a certain person is authenticated on the basis of personal identification information acquired from the IC card 40 or the like, a camera setting (recommended setting for each person) for the camera 20 recommended in a case where the person is imaged is determined. A camera setting for the camera 20 is controlled on the basis of the determined recommended setting. According to the configuration of the present example embodiment, an optimal camera setting for each person can be read and applied. Consequently, it is possible to avoid the occurrence of a problem that an optimal camera setting for a certain person is not suitable for another person. In other words, it is possible to expect an effect of increasing the overall accuracy of authentication by reducing a false rejection rate in a biometric authentication process.

As mentioned above, the example embodiments of the present invention have been described with reference to the drawings, but are not construed to be limited thereto, and may be variously modified or altered on the basis of the knowledge of a person skilled in the art without departing from the concept of the present invention. The plural constituent elements described in the example embodiments may implement various inventions through appropriate combinations. For example, some constituent elements may be deleted from all of the constituent elements described in the example embodiments, and may be combined with a constituent element of a separate example embodiment as appropriate.

Plural steps (processes) are sequentially described in the sequence diagram used in the description, but an execution order of steps executed in each example embodiment is not limited to the described order. In each example embodiment, an order of the illustrated steps may be changed within the scope without contradiction to contents thereof.

Some or all of the above-described example embodiments may be disclosed as in the following appendix, but are not limited thereto.

1. An information processing apparatus including:
an accumulation unit that accumulates a score obtained through an authentication process using an image in which a person is captured and a camera setting at which a camera generates the image in a storage area;
a recommended setting determination unit that determines a recommended setting for the camera on the basis of a correspondence relationship between the score and the camera setting; and
a camera control unit that controls the camera on the basis of the recommended setting.

2. The information processing apparatus according to 1.,
in which the camera control unit controls at least one of a posture of the camera, an imaging magnification of the camera, a length of an exposure time of the camera, luminance, saturation, an imaging resolution, and compression quality.

3. The information processing apparatus according to 1. or 2.,
in which the recommended setting determination unit determines the camera setting at which the score is highest as the recommended setting.

4. The information processing apparatus according to 1. or 2.,
in which the recommended setting determination unit determines the camera setting at which the score for each of plural persons is equal to or more than a predetermined reference value as the recommended setting.

5. The information processing apparatus according to 4.,
in which, in a case where there are the plural camera settings at which the score for each of the plural persons is equal to or more than the predetermined reference value, the recommended setting determination unit determines the recommended setting by using a statistically processed value of the scores calculated for each camera setting.

6. The information processing apparatus according to any one of 1. to 5.,
in which the recommended setting determination unit determines the recommended setting for each predetermined period.

7. The information processing apparatus according to any one of 1. to 6., in which the recommended setting determination unit determines the recommended setting for each temporal condition based on an operation timing of the camera.

8. The information processing apparatus according to any one of 1. to 7., further including:
an authentication unit that executes the authentication process.

9. The information processing apparatus according to 8., in which the authentication unit executes the authentication process on a person passing through a gate provided in a predetermined area.

10. A camera control method executed by a computer, the method including:
accumulating a score obtained through an authentication process on a person captured in an image and a camera setting at which a camera generates the image in a storage area;
determining a recommended setting for the camera on the basis of a correspondence relationship between the score and the camera setting accumulated in the storage area; and
controlling the camera on the basis of the recommended setting.

11. The camera control method executed by a computer according to 10., the method further including:
causing the computer to control at least one of a posture of the camera, an imaging magnification of the camera, a length of an exposure time of the camera, luminance, saturation, an imaging resolution, and compression quality.

12. The camera control method executed by a computer according to 10. or 11., the method further including:
causing the computer to determine the camera setting at which the score is highest as the recommended setting.

13. The camera control method executed by a computer according to 10. or 11., the method further including:
causing the computer to determine the camera setting at which the score for each of plural persons is equal to or more than a predetermined reference value as the recommended setting.

14. The camera control method executed by a computer according to 13., the method further including:
causing the computer to determine the recommended setting by using a statistically processed value of the scores calculated for each camera setting in a case where there are the plural camera settings at which the score for each of the plural persons is equal to or more than the predetermined reference value.

15. The camera control method executed by a computer according to any one of 10. to 14., the method further including:
causing the computer to determine the recommended setting for each predetermined period.

16. The camera control method executed by a computer according to any one of 10. to 15., the method further including:
causing the computer to determine the recommended setting for each temporal condition based on an operation timing of the camera.

17. The camera control method executed by a computer according to any one of 10. to 16., the method further including:
causing the computer to execute the authentication process.

18. The camera control method executed by a computer according to 17., the method further including:
causing the computer to execute the authentication process on a person passing through a gate provided in a predetermined area.

19. A program causing a computer to execute the camera control method according to any one of 10. to 18.

20. A camera including:
a transmission unit that transmits an image in which a person is captured and a camera setting at which the camera generates the image to an external apparatus; and
a setting changing unit that acquires recommended setting information indicating a camera setting recommended in a case where the camera generates an image from the external apparatus, and changes the camera setting for the camera on the basis of the recommended setting information.

21. An image processing system including:
a camera that generates an image in which a person is captured while changing a camera setting;
an authentication unit that executes an authentication process by using the image;
an accumulation unit that accumulates a score obtained through the authentication process and a camera setting at which the camera generates the image in a storage area;
a recommended setting determination unit that determines a recommended setting for the camera on the basis of a correspondence relationship between the score and the camera setting accumulated in the storage area; and
a camera control unit that controls the camera on the basis of the recommended setting.

22. The image processing system according to 21.,
in which the camera control unit controls at least one of a posture of the camera, an imaging magnification of the camera, a length of an exposure time of the camera, luminance, saturation, an imaging resolution, and compression quality.

23. The image processing system according to 21. or 22.,
in which the recommended setting determination unit determines the camera setting at which the score is highest as the recommended setting.

24. The image processing system according to 21. or 22.,
in which the recommended setting determination unit determines the camera setting at which the score for each of plural persons is equal to or more than a predetermined reference value as the recommended setting.

25. The image processing system according to 24.,
in which, in a case where there are the plural camera settings at which the score for each of the plural persons is equal to or more than the predetermined reference value, the recommended setting determination unit determines the recommended setting by using a statistically processed value of the scores calculated for each camera setting.

26. The image processing system according to any one of 21. to 25.,
in which the recommended setting determination unit determines the recommended setting for each predetermined period.

27. The image processing system according to any one of 21. to 26.,
in which the recommended setting determination unit determines the recommended setting for each temporal condition based on an operation timing of the camera.

28. The image processing system according to any one of 21. to 27., further including:
an authentication unit that executes the authentication process.

29. The image processing system according to 28.,
in which the authentication unit executes the authentication process on a person passing through a gate provided in a predetermined area.

It is apparent that the present invention is not limited to the above example embodiment, and may be modified and changed without departing from the scope and spirit of the invention.

It is apparent that the present invention is not limited to the above embodiment, and may be modified and changed without departing from the scope and spirit of the invention.

What is claimed is:

1. An information processing apparatus comprising:
a memory having stored therein program instructions; and
a processor configured to execute the program instructions, that when executed comprise:
an accumulation unit that accumulates a score obtained through an authentication process using an image in which a person is captured and a camera setting at which a camera generates the image in a storage area;
a recommended setting determination unit that determines a recommended setting for the camera on the basis of a correspondence relationship between the score and the camera setting; and
a camera control unit that controls the camera on the basis of the recommended setting,
wherein the recommended setting determination unit determines the camera setting at which the score is highest as the recommended setting.

2. The information processing apparatus according to claim 1,
wherein the camera control unit controls at least one of a posture of the camera, an imaging magnification of the camera, a length of an exposure time of the camera, luminance, saturation, an imaging resolution, and compression quality.

3. The information processing apparatus according to claim 1,
wherein the recommended setting determination unit determines the recommended setting for each predetermined period.

4. The information processing apparatus according to claim 1,
wherein the recommended setting determination unit determines the recommended setting for each temporal condition based on an operation timing of the camera.

5. The information processing apparatus according to claim 1, further comprising:
an authentication unit that executes the authentication process.

6. The information processing apparatus according to claim 5,
wherein the authentication unit executes the authentication process on a person passing through a gate provided in a predetermined area.

7. The information processing apparatus according to claim 1, wherein the score indicates a degree of certainty that the person in the captured image is a person authenticated in the authentication process.

8. An information processing apparatus comprising:
a memory having stored therein program instructions; and
a processor configured to execute the program instructions, that when executed comprise:
an accumulation unit that accumulates a score obtained through an authentication process using an image in which a person is captured and a camera setting at which a camera generates the image in a storage area;
a recommended setting determination unit that determines a recommended setting for the camera on the basis of a correspondence relationship between the score and the camera setting; and
a camera control unit that controls the camera on the basis of the recommended setting
wherein the recommended setting determination unit determines the camera setting at which the scores for a plurality of persons are equal to or more than a predetermined reference value as the recommended setting.

9. The information processing apparatus according to claim 8,
wherein, in a case where there are a plurality of the camera settings at which the scores for the plurality of persons are equal to or more than the predetermined reference value, the recommended setting determination unit determines the recommended setting by using a statistically processed value of the scores calculated for each camera setting.

10. The information processing apparatus according to claim 8, wherein the score indicates a degree of certainty that the person in the captured image is a person authenticated in the authentication process.

11. A camera control method executed by a computer, the method comprising:
accumulating a score obtained through an authentication process on a person captured in an image and a camera setting at which a camera generates the image in a storage area;
determining a recommended setting for the camera on the basis of a correspondence relationship between the score and the camera setting accumulated in the storage area; and
controlling the camera on the basis of the recommended setting,
wherein the determining a recommended setting for the camera comprises determining the camera setting at which the score is highest as the recommended setting.

12. A non-transitory computer readable medium storing a program causing a computer to execute a camera control method, the method comprising;
accumulating a score obtained through an authentication process on a person captured in an image and a camera setting at which a camera generates the image in a storage area;
determining a recommended setting for the camera on the basis of a correspondence relationship between the score and the camera setting accumulated in the storage area; and
controlling the camera on the basis of the recommended setting,
wherein the determining a recommended setting for the camera comprises determining the camera setting at which the score is highest as the recommended setting.

13. The non-transitory computer readable medium according to claim 12, wherein the score indicates a degree of certainty that the person in the captured image is a person authenticated in the authentication process.

14. A camera comprising:
a memory having stored therein program instructions; and
a processor configured to execute the program instructions, that when executed comprise:
a transmission unit that transmits an image in which a person is captured and a camera setting at which the camera generates the image to an external apparatus; and a setting changing unit that acquires recommended setting information indicating a camera setting recommended when the camera generates an image from the external apparatus, and changes the camera setting for the camera on the basis of the recommended setting information, wherein the recommended setting information is based on a correspondence relationship between a score obtained through an authentication process on the person captured in the image and the camera setting at which the camera generates the image and the score is highest.

15. An image processing system comprising:
a camera that generates an image in which a person is captured while changing a camera setting; and
an information processing apparatus comprising:
a memory having stored therein program instructions; and
a processor configured to execute the program instructions, that when executed comprise:
an authentication unit that executes an authentication process by using the image;

an accumulation unit that accumulates a score obtained through the authentication process and a camera setting at which the camera generates the image in a storage area;

a recommended setting determination unit that determines a recommended setting for the camera on the basis of a correspondence relationship between the score and the camera setting accumulated in the storage area; and a camera control unit that controls the camera on the basis of the recommended setting, wherein the recommended setting determination unit determines the camera setting at which the score is highest as the recommended setting.

16. The image processing system according to claim 15, wherein the score indicates a degree of certainty that the person in the captured image is a person authenticated in the authentication process.

* * * * *